United States Patent [19]

Darsey et al.

[11] Patent Number: 4,976,596
[45] Date of Patent: Dec. 11, 1990

[54] APPARATUS FOR RECOATING SPLICED LENGTHS OF OPTICAL FIBERS

[75] Inventors: Ralph J. Darsey, Lawrenceville; William J. Hurd, Stone Mountain, both of Ga.

[73] Assignee: AT&T Bell Laboratories, Murray Hill, N.J.

[21] Appl. No.: 376,772

[22] Filed: Jul. 7, 1989

Related U.S. Application Data

[62] Division of Ser. No. 133,579, Dec. 16, 1987, Pat. No. 4,865,411.

[51] Int. Cl.⁵ .............................................. B29C 35/08
[52] U.S. Cl. .................................. 425/117; 425/174.4
[58] Field of Search ................. 264/22, 25; 425/174.4, 425/116, 117; 219/347, 349; 350/96.21, 96.15

[56] References Cited

U.S. PATENT DOCUMENTS

| | | | |
|---|---|---|---|
| 2,553,259 | 5/1951 | Hagedorn | 219/349 |
| 3,975,618 | 8/1976 | Goos et al. | 219/349 |
| 4,183,737 | 1/1980 | Chown et al. | 65/4 |
| 4,290,668 | 9/1981 | Ellis et al. | 350/96.2 |
| 4,389,428 | 6/1983 | McDuffee et al. | 427/54.1 |
| 4,404,010 | 9/1983 | Bricheno et al. | 65/42 |
| 4,474,429 | 10/1984 | Yoldes et al. | 419/11 |
| 4,478,486 | 10/1984 | Fentress et al. | 350/96.2 |
| 4,585,304 | 4/1986 | Winter et al. | 350/96.21 |
| 4,627,942 | 12/1986 | Gagen et al. | 264/1.5 |
| 4,636,405 | 1/1987 | Mensah et al. | 427/54.1 |
| 4,657,343 | 4/1987 | Oldham et al. | 350/96.23 |
| 4,662,307 | 5/1987 | Amos et al. | 118/50.1 |
| 4,664,732 | 5/1987 | Campbell et al. | 156/158 |
| 4,669,820 | 6/1987 | Ten Berge | 350/96.2 |
| 4,728,469 | 3/1988 | Danner et al. | 425/174.4 |

FOREIGN PATENT DOCUMENTS

| | | | |
|---|---|---|---|
| 58-156912 | 9/1983 | Japan . | |
| 0070509 | 4/1984 | Japan | 425/174.4 |
| 2068142 | 8/1981 | United Kingdom . | |

*Primary Examiner*—Willard Hoag
*Attorney, Agent, or Firm*—Edward W. Somers

[57] ABSTRACT

Spliced end portions (30—30) of two optical fibers are recoated in a manner which results in the cross section of the spliced length of fiber transverse to a longitudinal axis thereof being substantially constant. This is accomplished without compromising the adhesion of a curable recoating material (51) to an adjacent original coating material (38). In order to provide such a recoated portion, original coating material which is removed to permit splicing is removed in such a manner as to leave a tapered portion (52) remaining on the end portion of each optical fiber. As a result, the interface between the recoating material and the original coating material is increased sufficiently to avoid having to overlap some of the recoating material with original coating material on adjacent portions of the fibers being spliced. Further, the spliced, recoated end portions are positioned at the focal point of a parabolic reflective surface (75) so that a portion of the radiation which is emitted toward the spliced end portions to cure the recoating material is reflected to engage non-exposed peripheral portions of the recoating material to insure uniformity of cure.

2 Claims, 5 Drawing Sheets

APPARATUS FOR RECOATING SPLICED LENGTHS OF OPTICAL FIBERS

This is a division of application Ser. No. 07/133,579 filed Dec. 16, 1987 now U.S. Pat. No. 4,865,411 issued Sept. 12, 1989.

TECHNICAL FIELD

This invention relates to apparatus for recoating spliced lengths of optical fibers. More particularly, it relates to the recoating of a fusion bonded optical fiber splice and portions of optical fibers adjacent to the splice which provides substantially improved integrity over recoated splices made in accordance with the prior art.

BACKGROUND OF THE INVENTION

The use of optical communications involving the use of optical fibers has grown at an unprecedented pace. Typically, an optical fiber has a diameter on the order of 125 microns, for example, and is covered with a coating material which increases the outer diameter of the coated fiber to about 250 microns, for example. Optical cables may comprise a plurality of these optical fibers which are stranded together or which are assembled in planar arrays which are referred to as ribbons.

The technology for forming low-loss optical fibers, which is shown for example in U.S. Pat. No. 4,217,027 which issued on Aug. 12, 1980 in the names of J. B. MacChesney and P. B. O'Connor, has advanced to a point where there is widespread commercial manufacturing of optical fibers. Most processing includes drawing an optical fiber from a previously manufactured glass boule, sometimes referred to as a preform. After it has been drawn, the optical fiber is usually provided with a layer of a protective curable coating material which may be cooled or cured thermally, by radiation, or by other suitable techniques for achieving solidification.

The introduction of optical fiber applications to evermore hostile environments, such as in underwater cable, has required that more stringent requirements be imposed on physical properties of the fiber, such as strength. For these more demanding applications as well as for other less demanding ones, it has become increasingly more common to splice optical fibers which have broken, either accidentally, or during appropriate proof testing. Additionally, extremely long lengths of fiber may be obtained by splicing a plurality of lengths which are obtained using current manufacturing techniques. For these and other applications, splicing in which the coating material is removed from end portions of two fibers which are then fused together end to end provides a suitable means for joining the ends of two glass fibers with an acceptable loss. However, the recoating of bared spliced fiber end portions continues as a problem to be overcome, especially while maintaining stringent requirements on dimensional and strength parameters associated with the coated fiber.

A method of recoating spliced end portions of optical fibers is disclosed in U.S. Pat. No. 4,410,561 which issued on Oct. 18, 1983 in the name of A. C. Hart, Jr. The method involves placing the spliced fiber end portions from which the original coating material has been removed and adjacent portions within a cavity in the form of a groove in a split mold. The effective diameter of the groove is somewhat greater than that of the remaining coated portion of each fiber. The fibers are positioned so that only portions of the coated portions of the fibers touch the surface which defines the groove, while the vulnerable, uncoated spliced end portions of the fibers remain suspended and do not contact the groove surface. Then, the mold is covered to enclose the groove and a suitable curable coating material is injected into the groove to recoat the bared, spliced fiber end portions. The recoating material contacts the adjacent originally coated portions of the spliced fibers along substantially radial planes exposed when the original coating material was removed from the end portions and along overlapping portions of the outer surface of the original coating material adjacent to the radial planes. The coating material is then cured to yield a recoated splice section with a transverse cross section which is larger than that of the optical fiber having the original coating material thereon.

This molding process provides a recoated splice; however, steps must be taken to avoid an undesirable number of residual bubbles in the recoating material. The existence of bubbles may lead to stress concentrations when the fiber is handled subsequently. This is particularly undesirable in underwater cables where splices are inaccessible and under stress for many years.

It appears that there are three sources of bubbles. These are air already present in the recoating material, air entrained during the molding process, and bubbles formed during the shrinkage of the recoating material during its cure. The bubbles due to shrinkage tend to be concentrated at the interface between the coating on the unbared fiber portions and the recoating material. This is caused by the pulling away of the recoating material from the coating material on the unbared fiber portions during curing.

Inadequate overlap between the recoating material and the original coating material on the unbared portions of the optical fibers is another problem. Long term integrity of the fiber may be affected by the failure of the recoating material to overlap adequately the original coating material on the portions of the fibers adjacent to the spliced end portions. It may result in the separation of the existing and recoating materials and expose the bare fiber.

Another problem which has surfaced recently relates to the use of optical fibers for tethered vehicles. In these, an optical fiber which is wound on a payoff device and connected to a guidance system is payed off as the vehicle is moved. The payoff device contains a length of precision wound optical fiber.

For tethered vehicles, the winding of the optical fiber on the payoff device must be accomplished in a precision manner. Otherwise, payoff could be disrupted. It has been found that it is difficult to wind a precision package with recoated splices which are made by present techniques. If the cross section of the recoated portion transverse of the longitudinal axis of the optical fiber is not the same as that of the optical fiber as originally coated, the winding pattern on the payoff device in all likelihood is not uniform. This will cause problems in fiber payoff following the launch of the tethered vehicle.

Seemingly, a recoated splice having the same transverse cross section as that of the unspliced fiber has not been attained by the use of prior art methods and apparatus. The transverse cross section of the recoated portion had to be larger to provide overlap of the recoating material with portions of the original coating material adjacent to the recoated end portions, otherwise the necessary adhesion to the original coating material would not be achieved only along the radial planes exposed by the baring of the end portions. When the recoated portion is made larger in a transverse cross section than that of the original coating material, a portion of the recoating material becomes adhered to peripheral portions of the original coated fiber lengths which are adjacent to the beginning of the recoated end portions of the optical fibers and supplements the adhesion along the radial planes.

What is needed and what seemingly is not provided by the prior art is a recoated optical fiber splice which may be used in providing a relatively long length of optical fiber for use in guiding a tethered vehicle, for example. Such a recoated splice must be implemented easily, must have the same transverse cross section as that of the original coated optical fiber and must have integrity of adhesion of the recoating material to the original coating material over a period of time. Also, the sought after methods which are to be used to recoat spliced end portions of optical fibers preferably are such that the formation of bubbles is avoided substantially.

SUMMARY OF THE INVENTION

The foregoing problems of recoated prior art splices have been overcome with methods of this invention for recoating spliced lengths of optical fibers. A first length of optical fiber is fusion bonded to a second length of optical fiber. Prior to bonding, each length of optical fiber is prepared for splicing. This is accomplished by chemically removing coating material from an end portion of each length of the fiber. The coating material is removed so as to leave a bared portion of optical fiber adjacent to the end of the end portion of each optical fiber and so as to leave a tapered length of the original coating material extending from the bared portion to the portion of the optical fiber adjacent to the end portion. In this way, an increased length of surface is provided to become the interface between the original coating material and the recoating material. As a result, there is enhanced adhesion between the original coating material and the recoating material, thereby insuring the integrity of the recoating material over the spliced portions of the lengths of optical fiber. Further, this permits the recoating of the spliced end portions to be accomplished so that the cross section of the spliced length of optical fiber transverse to the longitudinal axis of the optical fiber is substantially constant.

In a method of recoating spliced portions of lengths of optical fibers, the coating material on end portions of the lengths of each of two optical fibers is removed to leave a bared portion and a portion on which the coating material is conically shaped. The prepared end portions which have been spliced together are positioned in a passageway of a fixture with original coated portions of the lengths adjacent to the end portions being held in opposed vacuum chucks at opposite ends of the fixture. An injection port communicates a supply of a curable recoating material with the passageway. The passageway is formed in a mold block of material which is transparent to radiation used to cure the recoating material. The mold block of material is supported on a metallic pedestal. Along an upper surface of the pedestal is provided a trough which is in alignment with the passageway and spaced therefrom and which includes a polished reflective surface.

The methods of this invention assure that the recoating material which covers the spliced portions of the lengths of optical fibers are cured uniformly. After a curable recoating material has been injected through the port into the passageway and caused to encapsulate the bared and tapered portions of the end portions, it is cured by exposing it to suitable radiation. The trough in the metallic pedestal has a transverse cross section which is parabolic. Advantageously, the passageway is positioned at the focal point of the parabolic cross section of the trough so that radiation extending past the optical fiber is reflected by the wall of the trough and caused to engage the peripheral portion of the optical fiber which is not exposed directly to the radiation. As a result, the entire periphery of the optical fiber portions in the passageway is cured uniformly.

BRIEF DESCRIPTION OF THE DRAWINGS

Other objects and features of the present invention will be more readily understood from the following detailed description of specific embodiments thereof when read in conjunction with the accompanying drawings, in which.

Detailed Description

Figure 1:
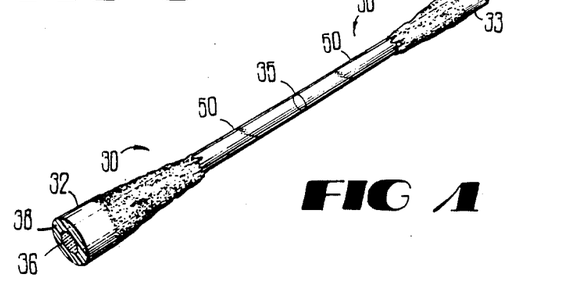
FIG. 1 is a perspective view of spliced end portions of two lengths of optical fibers which have been prepared in accordance with this invention to receive a recoating material.

Referring now to FIG. 1, there are shown end portions 30—30 of two lengths, a first length 32 and a second length 33, of optical fiber which have been spliced together to form a juncture 35. Each of the optical fibers includes an optical fiber 36 having a coating material 38 applied thereon (see FIG. 1). As is well known, the optical fiber 36 includes a core and a cladding. An outer diameter of the coated fiber is on the order of 250 microns. The bared end portions 30—30 from which the coating material 38 has been removed at least partially have been spliced together by a technique such as fusion bonding which is disclosed in an article entitled "Optical Fiber Joining Technique" which was authored by D. L. Bisbee and which appeared beginning at page 3153 of Vol. 50 No. 10 of the December 1971 issue of the *Bell System Technical Journal*. Each end portion 30 has a length of about 0.5 inch. The spliced end portions 30—30 are recoated in accordance with the methods of this invention.

Figure 2:
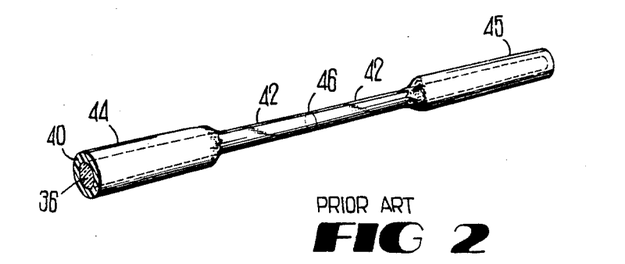
FIG. 2 is a perspective view of end portions of lengths of optical fiber which have been prepared for recoating in accordance with prior art methods and apparatus.

Typically, spliced end portions of optical fiber lengths prior to recoating appear as shown in FIG. 2. There it can be seen that a coating material 40 has been removed from an end portion 42 of each of two optical fibers 44 and 45 which have been spliced together to form a juncture 46. The portion of the coating material that has been removed is generally in the shape of a cylindrical tube or sleeve. An exposed end face 47 of the coating material lies generally in a plane which generally is normal to a longitudinal axis 48 of the optical fiber (see FIG. 3). After the end portions of the optical fiber lengths have been fusion bonded together, they must be recoated. This may be accomplished by using methods and apparatus such as, for example, those disclosed in U.S. Pat. No. 4,627,942 which issued on Dec. 9, 1986 in the names of P. F. Gagen, et al. and which is incorporated by reference hereinto. Typically, a portion 49 of a recoating material extends past the radial end face plane 47 of the end portion 42 of the optical fiber and overlaps a portion of the original coating material (see FIG. 3). This is done in order to provide sufficient interfacial area between the original coating material and the recoating material to insure the integrity of the coating and recoating materials along the interface therebetween over a period of time.

Figure 3:
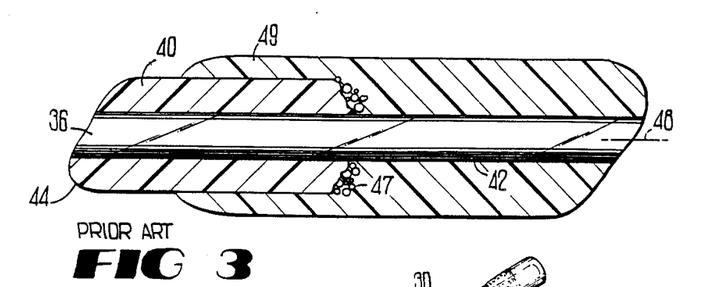
FIG. 3 is a side elevational view of one of the end portions of FIG. 2 after a recoating material has been applied thereover.

As can best be seen in FIG. 3, the interface between the recoating material 49 and the original coating material without the overlap is not much greater than the cross-sectional annular area of the original coating material. As a result, the opportunity for adhesion between the original coating and recoating materials is somewhat limited. Of course, the overlapped portion is additive to this, but this causes the cross section of the recoated end portion of the optical fiber transverse to the longitudinal axis of the optical fiber to exceed that of the optical fiber with the original coating material thereon.

Figure 4:
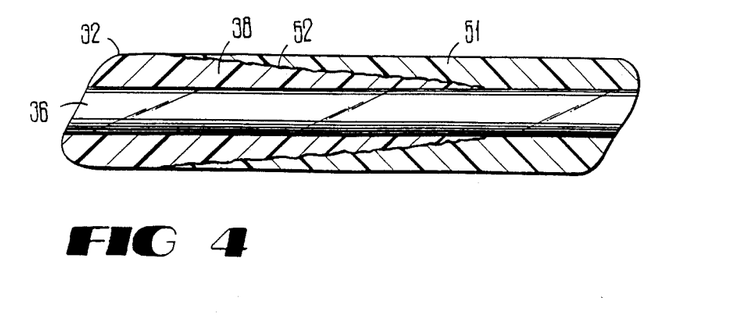
FIG. 4 is a side elevational view of one of the spliced end portions of FIG. 1 after a recoating material has been applied thereover.

This problem is overcome by configuring the stripped end portion of each length of optical fiber to appear as is shown in FIGS. 1 and 4. As can be seen in those figures, the coating material 38 is removed completely from a portion 50 of each end portion 30. Also, a tubular portion of the coating material is removed from each end portion 30 adjacent to the bared portion 50 in such a manner as to cause a tapered portion 52 to remain. The tapered portion 52 of original coating material has a generally truncated conical shape. In other words, in the vicinity of the splice juncture 35, the original coating material increases from a transverse cross section substantially equal to the transverse cross section of the uncoated clad optical fiber of the bared portion 50 to the transverse cross section of the original coated optical fiber. Typically, the distance from the juncture 35 to the beginning of the tapered portion 52, i.e. the length of the bared portion 50, is about 0.25 inch or more and the length of the tapered portion of the original coating material is equal at least to the product of three and the largest dimension of a transverse cross section of a coated optical fiber but does not exceed a value of about 0.25 inch.

Such a configuration of the coating material remaining after stripping is highly advantageous during recoating. As can best be seen in FIG. 4, a recoating material 51 abuts the original coating material along an interface which is substantially larger than that of FIG. 3. As a result, there is substantial interfacial contact between the original coating material 38 and the recoating material 51 to provide sufficient adhesion and prevent unwanted separation of the recoating material from the spliced end portions of the lengths of the optical fibers.

Further, and importantly, the increased interfacial contact of the recoating material 51 and the original coating material 38 obviates the need for overlap as used in FIG. 3. As a result, the transverse cross section of the recoated end portions 30—30 may be held to be substantially the same as that of the optical fiber having the original coating material 38 thereon. In other words, the cross section of the coated optical fiber along portions having the original coating material 38 thereon and along those portions which have been recoated is substantially constant.

Prior to the fusion bonding and recoating steps of providing a spliced length of optical fiber, the end portions 30—30 of two lengths of optical fiber must be prepared. Preparation includes the complete removal of the original coating material from a portion 50 of the end portion 30. Preparation also includes the removal of a portion which is contiguous to the portion 50 (see FIG. 1) and which has a transverse cross section that decreases in a direction from the portion 50 to the coated optical fiber adjacent to the end portion 30.

Figure 5:
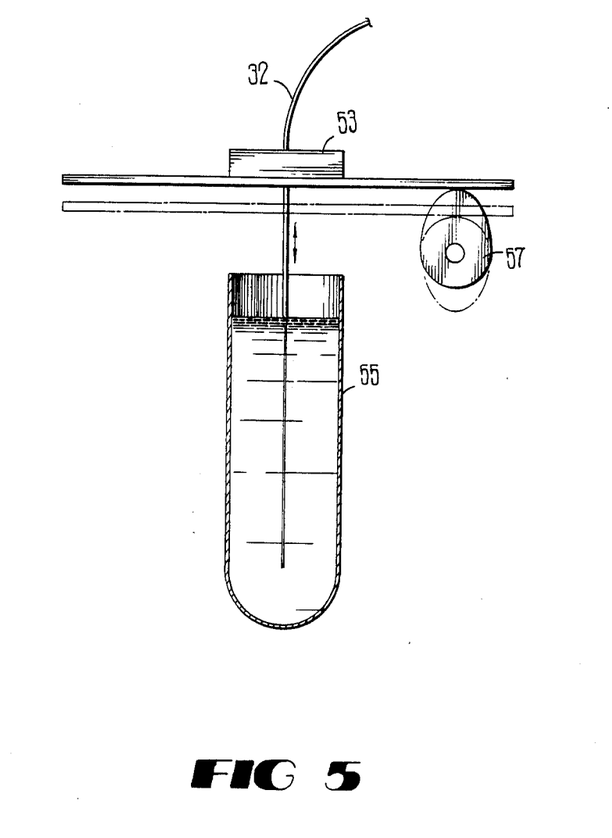
FIG. 5 is a schematic view of an apparatus for removing coating material from a portion of the length of an optical fiber.

In FIG. 5, there is shown a holder 53 for holding an optical fiber length 32 above a container 55 of a suitable liquid material such as an acid which may be used to remove coating material from an end portion 30 of an optical fiber to provide the configuration shown in FIG. 1. The holder 53 is adapted to be moved vertically reciprocally by turning a cam 57.

An operator mounts the optical fiber 32 in the holder 53 with a portion of the optical fiber contiguous to an end of the optical fiber being immersed in the liquid material in the container 55. This causes the coating material 38 to be removed completely from that portion which is immersed to form a bared portion. Then the operator causes the cam 57 to be turned. As a result, the portion of the end portion 30 of the optical fiber which is adjacent to the bared portion is moved into and out of the container 55 in one or more cycles to remove the coating material partially therefrom to form the tapered portion 52 shown in FIG. 1. The configuration of the tapered portion 52 is a function of the temperature of the liquid material in the container 55 as well as the cycle time and the configuration of the cam. Subsequently, the operator causes the bared portion to be broken to provide the bared portion 50 having a desired length.

Then, end portions of two lengths of optical fibers having the coating material thereon removed as described hereinabove are spliced together by fusion bonding for example. The spliced end portions 30—30 are now ready to be recoated.

Figure 6:
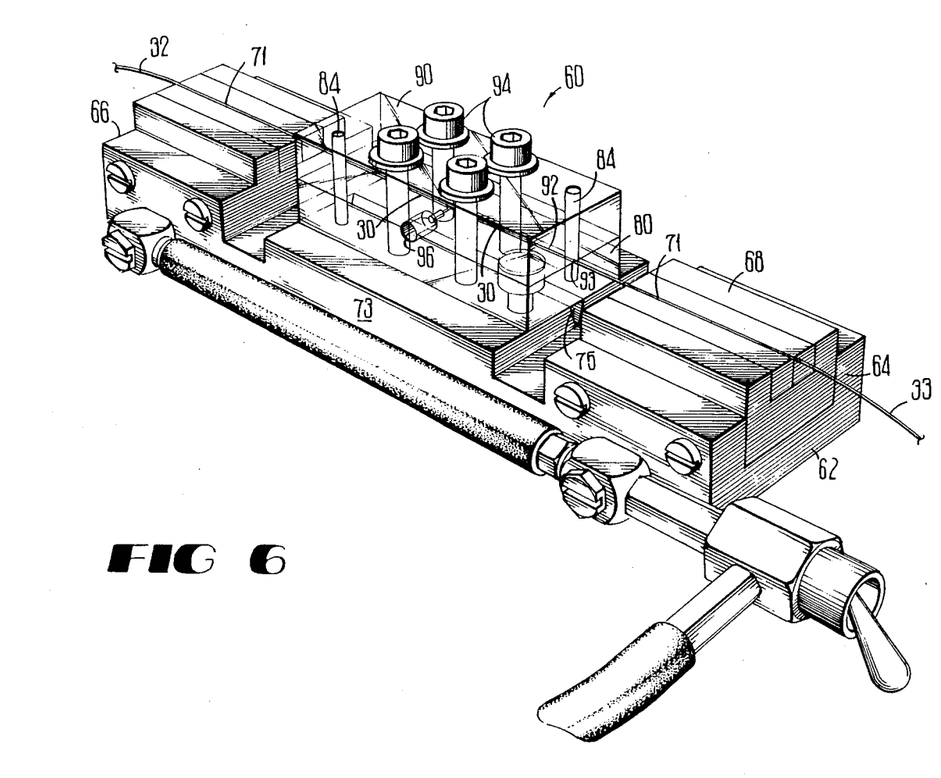
FIG. 6 is a perspective view of an apparatus for recoating spliced end portions of two lengths of optical fibers.

Shown in FIG. 6 is an apparatus designated generally by the numeral 60 for recoating the spliced together ends of the lengths of optical fibers. The apparatus 60 includes a base 62 which includes two ways 64 and 66 spaced along a longitudinal axis of the base. Mounted in each of the ways 64 and 66 is a vacuum chuck 68. Each chuck 68 includes a groove 71 which extends generally parallel to the longitudinal axis of the base. Each of the grooves 71—71 has a transverse cross section such that it is capable of holding a length of coated optical fiber. Further, the wall of each of the grooves 71—71 is connected to a source of vacuum (not shown) to hold a coated optical fiber in the groove during the recoating process.

As further can be seen in FIG. 6 (see also FIG. 7), a center portion 73 of the base 60 is raised somewhat over adjacent portions. The center portion 73 includes a longitudinally extending trough 75 which in transverse cross section has a parabolic configuration. This trough 75 is referred to as a reflective chamber and typically is milled in a base which is made of aluminum. The surface of the trough 75 is polished.

Figure 7:
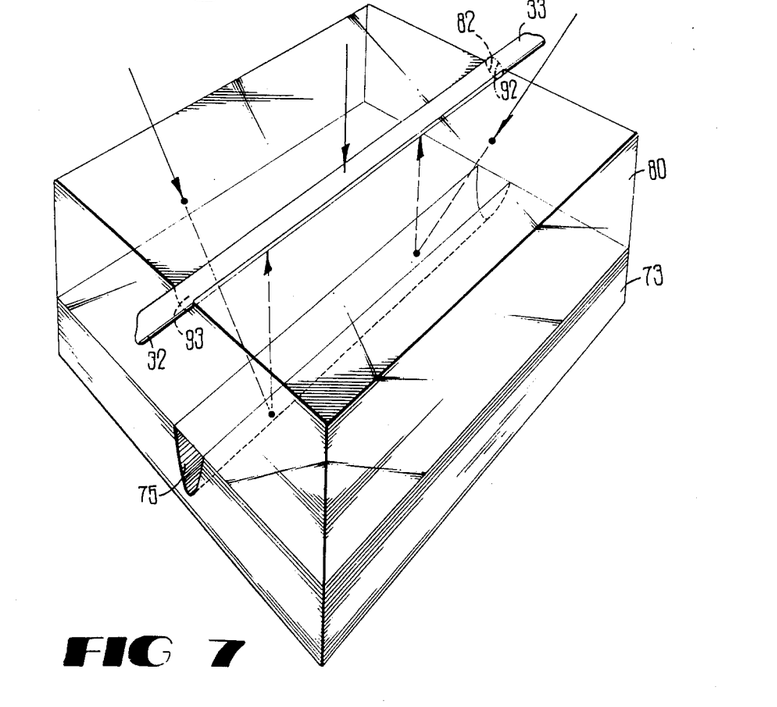
FIG. 7 is a perspective view of a fixture of the apparatus of FIG. 6 which may be used to support spliced end portions of lengths of optical fibers for recoating in accordance with this invention.

Supported on the center portion 73 is a mold block 80 (see FIGS. 6 and 7). The mold block 80 includes a longitudinal extending groove 82 which is adapted to hold the spliced end portions of two lengths of optical fibers. Projecting upwardly from two corners of the mold block 80 are two alignment pins 84—84. The alignment pins 84—84 are used to align a top mold block 90 with the mold block 80. The mold blocks are made from a material which is transparent to ultraviolet (UV) radiation such as Plexiglas® UV transparent material or equivalent resin material or quartz, for example.

The top mold block 90 also includes a longitudinally extending groove 92 which is adapted to cooperate with the groove 82 in the mold block 80 to provide a passageway 93 to enclose the spliced end portions of the two lengths of optical fibers. Further, the top mold block 90 is secured to the mold block 80 to provide a close fitting groove for those end portions by four bolts 94—94, or other suitable clamping means.

When the top mold block 90 is secured to the bottom mold block 80, passageway 93 communicates with an injection nozzle 96 (see FIG. 6). The injection nozzle 96 is connected to a supply of recoating material which preferably is the same material which was used to coat the drawn fiber. Such a material may be a UV curable acrylate material, for example.

Portions of the spliced lengths 32 and 33 of the optical fibers adjacent to the end portions 30—30 are caused to be received in the grooves 71—71 in the chucks 68—68. Vacuum is applied to hold those portions during the recoating step. With the portions of the lengths of optical fibers held in the vacuum chucks 68—68, the lengths of the optical fiber which are spliced together are disposed in the passageway 93 formed by the cooperating grooves in the top mold block 90 and the mold block 80.

Figure 8:
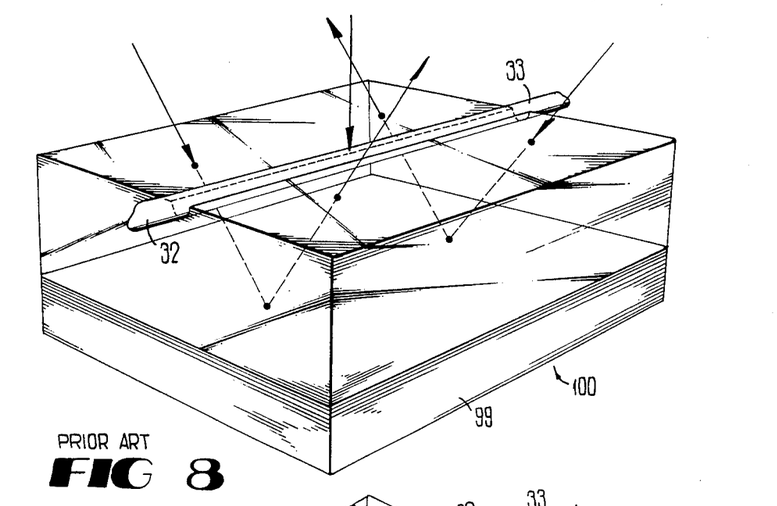
FIG. 8 is a perspective view of a prior art fixture for supporting spliced end portions of optical fibers to be recoated.

Also, it should be observed that the passageway 93 formed by the grooves in the top mold 90 and in the mold 80 is aligned with the reflective chamber 75. The spatial relationship of the passageway 93 and the reflective chamber 75 is such that the passageway is disposed at the focal point of the parabolic configuration of the reflective chamber. As a result of this arrangement, the curing of the recoating material by exposure to UV radiation from a source (not shown) is enhanced substantially. This will become apparent by comparing FIGS. 7 and 8. In FIG. 8, there is depicted a prior art apparatus 100 for curing the recoating applied over spliced end portions. As the UV radiation is directed past the spliced end portions, it engages a metallic base plate 99 and is reflected. It is unlikely that the reflected radiation will be directed to the underside of the recoating material. Hence, the recoating material may not be cured uniformly.

On the other hand, the arrangement which is shown in FIG. 7 assures substantially uniformity of cure in the recoating material. The UV energy radiating past the optical fiber end portions 30—30 and contacting the parabolic surface is reflected. Because the recoated portions are disposed at the focal point of the parabolic reflecting surface, the reflected radiation contacts those portions of the periphery of the recoating material which are not exposed directly to the emitted radiation, thereby ensuring the uniformity of cure.

Figure 9:
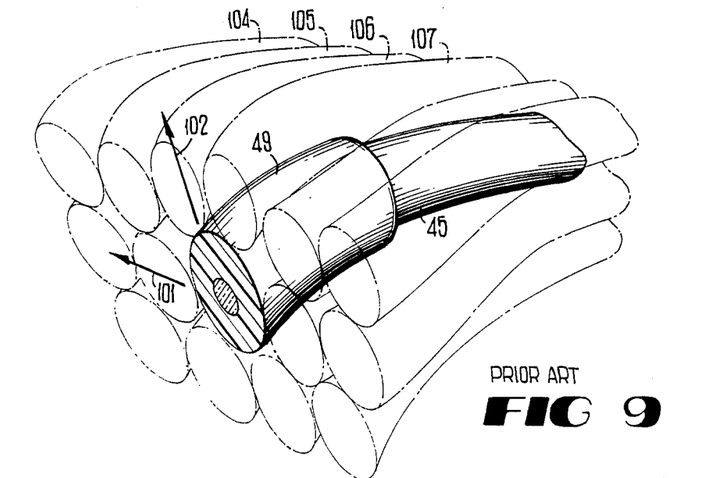
FIG. 9 is a perspective view of spliced lengths of optical fiber wound on a spool, the spliced portion of which has been recoated by prior art methods.
Figure 10:
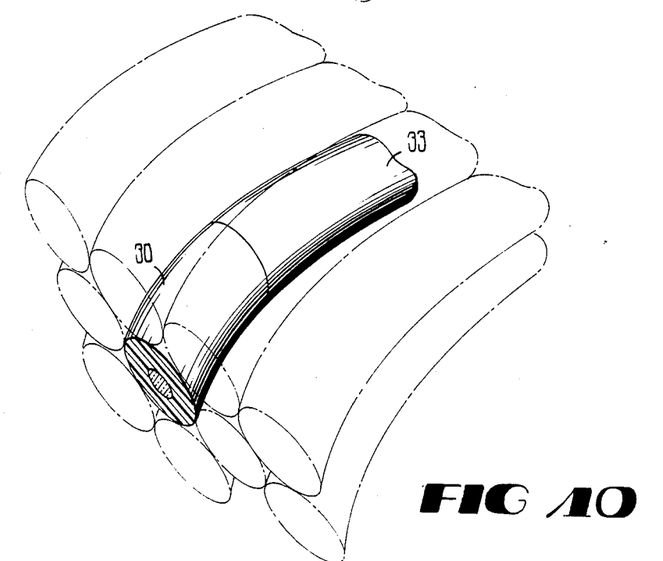
FIG. 10 is a perspective view of spliced lengths of optical fiber wound on a spool, the spliced portion shown having been recoated in accordance with the methods of this invention.

The resulting product is a relatively long length of optical fiber which has a substantially constant cross section transverse to the longitudinal axis of the optical fiber. The cross section of the recoated spliced portions transverse to the longitudinal axis of the optical fiber are substantially equal to that of the unspliced end portions. This equivalence of transverse cross section is advantageous particularly in the winding of the fiber on a spool or other payout device. With prior art recoatings, as mentioned hereinbefore, the transverse cross section of a spliced portion is larger than that of the unspliced portions. As a result, when such spliced portions are wound with convolutions of optical fiber on a spool laterally and outwardly, as shown by the arrows 101 and 102 in FIG. 9, the winding pattern is disrupted and non-precise winding occurs. The overlapped portion 49 (see FIGS. 3 and 9) of a recoating material causes unwanted displacement in the direction shown by the arrow 101 in FIG. 9 of adjacent convolutions in the same layer and of those conductors above the spliced portion covering the spliced portion. As a result, those portions of the convolutions are not nested between adjacent convolutions of adjacent layers. Furthermore, the enlarged splice causes unwanted bulging of the portion of fiber directly covering the splice, as can be seen by portions 104, 105, 106, and 107, for example in FIG. 9. This may result in snags during payoff as portions of outer convolutions become caught in spacing between the spliced portions and convolutions adjacent thereto. With spliced portions recoated by the methods and apparatus of this invention, a precise winding pattern is acheivable without any spacing between convolutions which include the recoated portions and those that do not (see FIG. 10).

The recoating technique of this invention also helps to avoid the occurrence of bubbles adjacent to the interface. Bubbles tend to become entrapped at the interface between the original coating material and the recoating material. Also, when the recoating material is applied, it contracts and tends to pull bubbles outwardly from the original coating material into the interface. The existence of bubbles is unwanted, particularly at the interface, because of possible adverse affects on the adhesion level across the interface. It has been found that because of the lengthened interface provided by the methods and apparatus of this invention, any bubbles tend to be moved outwardly toward the outer surface of the optical fiber and are not residual in the recoated splice portions.

It is to be understood that the above-described arrangements are simply illustrative of the invention. Other arrangements may be devised by those skilled in the art which will embody the principles of the invention and fall within the spirit and scope thereof.

What is claimed is:

1. An apparatus for recoating end portions of lengths of optical fiber which have been spliced together, said apparatus including:
   chuck means for holding portions of lengths of fibers adjacent to end portions thereof which are spliced together;
   mold means providing a passageway in which are received the end portions which are spliced together and portions of the optical fibers between those held in said chuck means and the end portions;
   injection means for introducing a curable recoating material into said passageway to recoat the end portions;
   radiation means for emitting energy toward engagement with the recoated portions of the optical fibers to cure the recoating material, said mold means being comprised of a material which is transparent to energy emitted by said radiation means; and
   reflective means for reflecting radiant energy moved past the recoated end portions and effective to cause the reflected radiant energy to engage portions of the recoated portions not directly engaged by energy from said radiation means, said reflective means comprising a curved surface wherein said curved surface has a parabolic configuration having a focal point disposed external to an area bounded by said parabolic configuration and a line which connects end points of said parabolic configuration and wherein the passageway and reflective surface are positioned relative to each other such that the passageway is disposed at the focal point of the parabolic reflecting surface, said mold means being disposed between said radiation means and said reflective means.

2. The apparatus of claim 1, wherein said radiation means comprises a source of ultraviolet radiation and said mold means is transparent to ultraviolet radiation.

* * * * *